United States Patent
Kakiuchi et al.

[11] Patent Number: 5,803,812
[45] Date of Patent: Sep. 8, 1998

[54] FLEXIBLE SHAFT STRUCTURE FOR TRANSMITTING HIGH TORQUE

[75] Inventors: Eisaku Kakiuchi, Toyota; Tadao Ota, Okazaki; Yoshikazu Kameda; Masahiko Asano, both of Toyota, all of Japan

[73] Assignee: Toyota Jidosha Kabushiki Kaisha, Toyota, Japan

[21] Appl. No.: 677,959

[22] Filed: Jul. 10, 1996

[30] Foreign Application Priority Data

Aug. 7, 1995 [JP] Japan .................................. 7-200751

[51] Int. Cl.⁶ .................................................. F16C 1/00
[52] U.S. Cl. ...................................... 464/58; 267/155
[58] Field of Search ............................... 464/58, 57, 51, 464/52; 267/155, 168, 275, 285

[56] References Cited

U.S. PATENT DOCUMENTS

| | | | |
|---|---|---|---|
| 1,429,146 | 9/1922 | Karge | 464/58 |
| 1,472,782 | 11/1923 | Barber | 464/58 |
| 1,979,869 | 11/1934 | Charter | 267/155 X |
| 2,949,753 | 8/1960 | Menoni | |
| 3,000,197 | 9/1961 | Ruegg et al. | 464/58 |
| 3,726,133 | 4/1973 | Morgan | 464/58 X |
| 3,791,898 | 2/1974 | Remi | 464/58 X |
| 5,052,404 | 10/1991 | Hodgson | 464/58 X |
| 5,165,421 | 11/1992 | Fleischhacker et al. | 464/58 X |
| 5,368,283 | 11/1994 | Pavlin | 267/155 |

FOREIGN PATENT DOCUMENTS

| | | | |
|---|---|---|---|
| A-2-240-367 | 3/1975 | France . | |
| C-822-044 | 11/1951 | Germany . | |
| A-49-086 | 7/1966 | Germany . | |
| B-12-83-030 | 11/1968 | Germany . | |
| A-34-20-740 | 1/1985 | Germany . | |
| 30339 | 3/1979 | Japan | 464/58 |
| 63-180714 U | 11/1988 | Japan . | |
| WO-A-95-16141 | 6/1995 | WIPO . | |

*Primary Examiner*—Donald P. Walsh
*Assistant Examiner*—Emmanuel M. Marcelo
*Attorney, Agent, or Firm*—Oliff & Berridge, PLC

[57] ABSTRACT

A flexible shaft structure comprises: a core wire having flexibility; holding portions provided on the core wire; a first wire wound around the core wire substantially at right angles with respect to an axial line of the core wire; and a second wire which is spirally wound around the first wire and of which both ends are respectively fixed to the holding portions. Accordingly, when an input-side holding portion rotates about a shaft, the rotational torque is transmitted to an output-side holding portion by the second wire. In this case, since the second wire is wound around the first wire wound around the core wire, the winding diameter of the second wire for transmitting rotational torque can be enlarged. As a result, tensile force acting on the second wire becomes smaller and stress acting on the core wire via the first wire or the holding portions accordingly becomes smaller.

26 Claims, 7 Drawing Sheets

F I G. 6
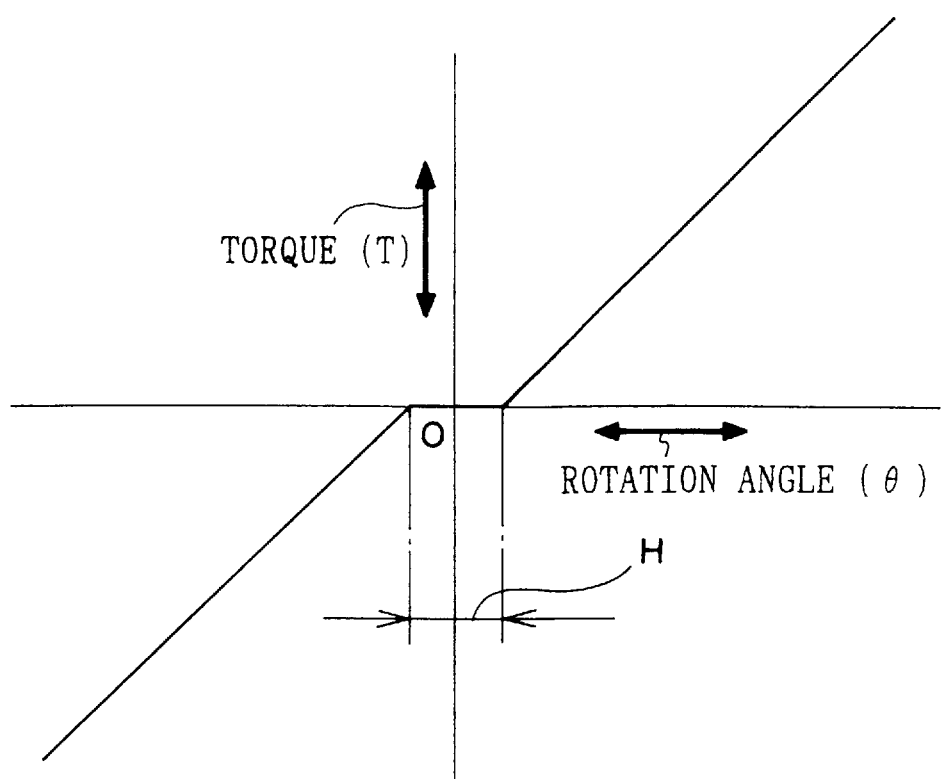

FLEXIBLE SHAFT STRUCTURE FOR TRANSMITTING HIGH TORQUE

BACKGROUND OF THE INVENTION

FIELD OF THE INVENTION

The present invention relates to a flexible shaft structure, and particularly to a flexible shaft structure which is used to transmit high torque.

DESCRIPTION OF THE RELATED ART

Conventionally, in an automobile or the like, a flexible shaft structure is applied, as rotation transmission means, to a portion where rotation cannot be linearly transmitted. One example of the flexible shaft structure is disclosed in Japanese Utility Model Application laid-Open (JP-U) No. 63(1988)-180714.

As shown in FIG. 7, in this flexible shaft structure, a core wire 71 of a flexible shaft 70 is formed in such a manner that three thin steel wires 71A are twined thereinto and a thick steel wire 72 which is made thicker than the core wire 71 is directly wound spirally on the core wire 71 to form a first winding layer 74. Further, a soft iron wire 76 is wound on the first winding layer 74 in a direction opposite to the winding direction of the steel wire 72 to form a second winding layer 78. Moreover, a steel wire 80 and a soft iron wire 82 are wound on the second winding layer 78 in opposite directions to form a third winding layer 84 and a fourth winding layer 86, respectively.

However, in the above-described flexible shaft structure, as the circle diameter of each winding layer becomes smaller, the tensile force of each winding at the time of transmission of torque becomes larger. Further, as the tensile force of each winding becomes larger, stress which acts in an axial direction and a radial direction of the core wire due to tying of each winding becomes large. Namely, the stress which the core wire can withstand is an element which determines an upper limit value of transfer torque.

Accordingly, in order to make transfer torque larger, it is necessary to increase rigidity of the core wire. However, when the rigidity of the core wire is increased, flexibility of the flexible shaft 70 is damaged. For this reason, when this flexible shaft structure is used for a part such as a steering system of an automobile, in which transmission of high torque is required, there exists a drawback in that flexibility of the flexible shaft deteriorates.

Further, in a case in which the transfer torque is transmitted, if the circle diameter of the core wire is made larger, the tensile force of each winding can be made smaller. However, in this case as well, the rigidity of the core wire is increased, and the flexibility of the flexible shaft deteriorates accordingly.

SUMMARY OF THE INVENTION

In view of the above-described circumstances, it is an object of the present invention to provide a flexible shaft structure which has high rigidity and allows transmission of high torque without lowering the flexibility thereof.

A first aspect of the present invention is a flexible shaft structure comprising: a core wire having flexibility; holding portions provided on the core wire; a first wire wound around the core wire substantially at right angles with respect to an axial line of the core wire; and a second wire which is spirally wound around the first wire and of which both ends are respectively fixed to the holding portions.

Accordingly, in the flexible shaft structure according to the first aspect of the present invention, when an input-side holding portion is rotated about a shaft, the rotational torque is transmitted to an output-side holding portion by the second wire. In this case, since the second wire is wound around the first wire wound around the core wire, the winding diameter of the second wire for transmitting rotational torque can be enlarged. Accordingly, tensile force acting on the second wire becomes smaller and stress acting on the core wire via the first wire or the holding portions accordingly becomes smaller, which becomes advantageous to the rigidity of the core wire. Consequently, it is possible to provide a flexible shaft structure having high rigidity and allowing transmission of high torque by using the core wire which is thin enough not to lower the flexibility of the flexible shaft.

In addition, even when the flexible shaft is provided to be bent, the first wire is wound around the core wire substantially at right angles with respect to the axial line of the core wire so as not to extend in the axial direction of the core wire and stress applied to the first wire is made smaller due to the bending of the flexible shaft. Accordingly, the core wire around which the first wire is wound is easy to bend and the flexibility of the flexible Shaft does not deteriorate.

In the above aspect, the holding portions can be provided at both end portions of the core wire.

A second aspect of the present invention is a flexible shaft structure according to the first aspect, which further comprises: movement-amount adjusting means by which at least one of the holding portions is disposed movably in a direction along the axial line of the core wire with respect to the core wire and which adjusts an amount by which the at least one of the holding portions moves.

In the flexible shaft structure according to the second aspect of the present invention, an amount by which the holding portion moves at the time of transmission of rotational torque varies by the movement-amount adjusting means. For this reason, when, for example, a clearance is formed between an output-side holding portion and the core wire by the movement-amount adjusting means, even if tensile force is applied to the second wire due to the rotational torque inputted from the input-side holding portion, load is not applied to the output-side holding portion due to the clearance formed between the output-side holding portion and the core wire. In this case, although the output-side holding portion rotates, the torque is not transmitted to the output-side holding portion.

On the other hand, when load is applied to the output-side holding portion, the output-side holding portion does not rotate and moves in a direction in which it abuts against the core wire. However, so long as the clearance exists between the output-side holding portion and the core wire, the torque is not transmitted to the output-side holding portion.

Accordingly, the period when the clearance exists is a dead zone of torque transmission.

Subsequently, when the output-side holding portion abuts against the core wire, movement of the output-side holding portion toward the core wire is prevented and the torque is transmitted to the output-side holding portion.

Further, when the output-side holding portion is pressed against the core wire by the movement-amount adjusting means so that tensile force is applied to the second wire, the rotational torque inputted from the input-side holding portion is directly transmitted to the output-side holding portion and a large torque can be transmitted from the vicinity of a neutral position of rotation accordingly.

BRIEF DESCRIPTION OF THE DRAWINGS

FIG. 6 is a graph showing a relationship between a rotation angle and torque of the flexible shaft structure according to the second embodiment of the present invention.

DESCRIPTION OF THE PREFERRED EMBODIMENTS

Figure 1:
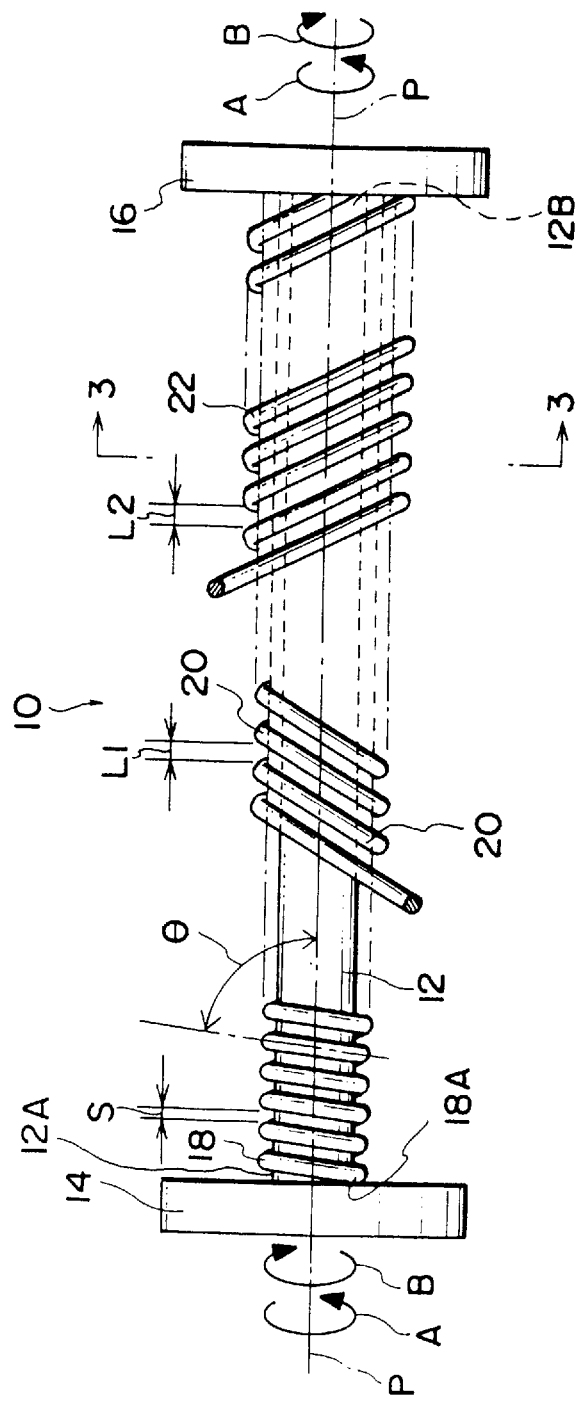
FIG. 1 is a schematic structural view showing a flexible shaft structure according to a first embodiment of the present invention.

A first embodiment of a flexible shaft structure of the present invention will be described hereinafter with reference to FIGS. 1 through 3.

A flexible shaft 10 according to the first embodiment of the present invention includes one core wire 12. Disk-shaped holders 14, 16 each serving as a holding portion are provided to abut against end portions 12A, 12B of the core wire 12, respectively.

A first wire 18 is spirally wound around the core wire 12 with a very small clearance S being formed at an interval of adjacent turns thereof. Both end portions 18A of the first wire 18 (in FIG. 1, only the left-handed end portion is shown) abut against the holders 14, 16, respectively. Further, a winding angle θ of the first wire 18 with respect to the axial line P of the core wire 12 is substantially a right angle (i.e., substantially ±90 degrees). Meanwhile, the end portions 18A of the first wire 18 may be respectively fixed to the holders 14, 16.

An inward winding wire 20 serving as a second wire is spirally wound around the first wire 18 with a predetermined clearance L1 being formed at an interval of adjacent turns thereof. An outward winding wire 22 serving as the second wire is spirally wound around the inward winding wire 20 with a predetermined clearance L2 being formed at an interval of adjacent turns thereof. It should be noted that the inward winding wire 20 and the outward winding wire 22 are wound in opposite directions, and each winding angle of the inward winding wire 20 and the outward winding wire 22 with respect to the axial line P of the core wire 12 is set ±45 through 60 degrees.

Figure 2:
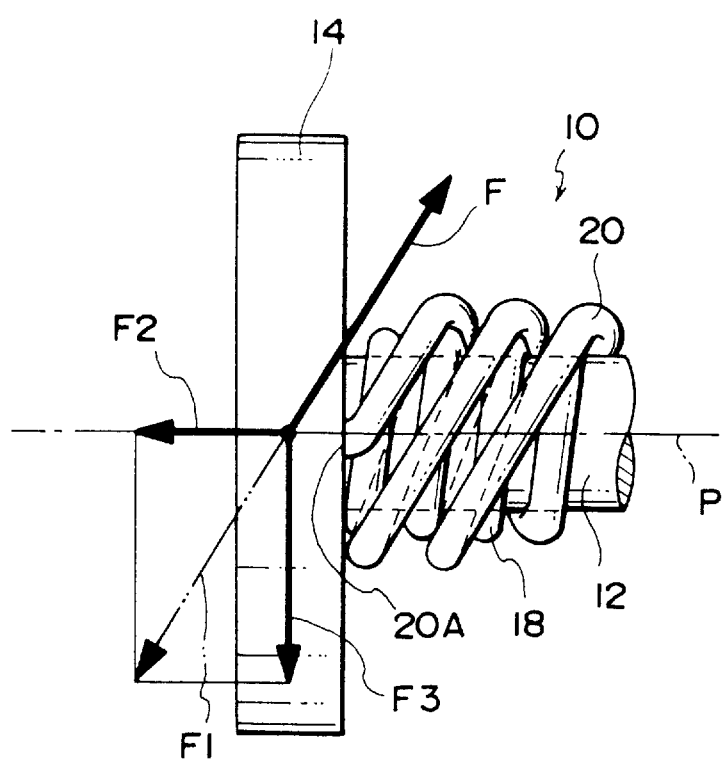
FIG. 2 is a side view showing a part of an end portion of the flexible shaft structure according to the first embodiment of the present invention.

As shown in FIG. 2, both end portions 20A of the inward winding wire 20 (in FIG. 2, only the left-handed end portion is shown) are respectively fixed to the holder 14 and the holder 16 shown in FIG. 1. Further, although not illustrated, both end portions of the outward winding wire 22 are also fixed to the holders 14, 16, respectively. Accordingly, when the input-side holder 16 is rotated around the axial line P of the core wire 12 in a predetermined direction, i.e., in the direction indicated by arrow B in FIG. 1, the rotational torque is transmitted through the inward winding wire 20, and as shown in FIG. 2, the tensile force (indicated by arrow F in FIG. 2) is provided to act on a portion of the inward winding wire 20 connected to the output-side holder 14. As a result, reaction force F1 of the tensile force F of the inward winding wire 20 can be dispersed via the holder 14 to axial force F2 of the core wire 12 and force F3 of the inward winding wire 20 tightening the first wire 18.

Next, an operation of the first embodiment will be described.

In the flexible shaft structure of the first embodiment of the present invention, when the input-side holder 16 of the flexible shaft 10 is rotated around the axial line P of the core wire 12 in the predetermined direction, for example, in the direction indicated by arrow B in FIG. 1, the rotational torque is transmitted by the inward winding wire 20, and as shown in FIG. 2, the tensile force (indicated by arrow F in FIG. 2) acts on a portion of the inward winding wire 20 connected to the output-side holder 14.

Accordingly, the reaction force F1 of the tensile force F of the inward winding wire 20 is dispersed via the holder 14 to the axial force F2 of the core wire 12 and the force F3 of the inward winding wire 20 tightening the first wire 18.

In this case, the inward winding wire 20 is wound around the first wire 18 wound on the core wire 12. For this reason, as compared with a structure in which a wire for transmitting rotational torque is directly wound around the core wire 12, the entire winding diameter of the inward winding wire 20 and the outward winding wire 22 for transmitting the rotational torque can be made larger. Accordingly, the tensile force acting on the inward winding wire 20 and the outward winding wire 22 becomes smaller and the stress applied to the core wire 12 via the first wire 18 or the holding portions also becomes smaller, which is preferable for the rigidity of the core wire 12. As a result, it is possible to use the core wire 12 which is thin enough not to lower the flexibility of the flexible shaft 10 and to provide a flexible shaft structure having high rigidity and allowing transmission of high torque without lowering the flexibility thereof.

In addition, with the flexible shaft 10 bent, even when the input-side holder 16 is rotated axially, the first wire 18 is tightened by the inward winding wire 20 and the outward winding wire 22. However, since the first wire 18 is wound around the core wire 12 at an angle which is substantially perpendicular to the axial line of the core wire 12 and is easily bent, there is no possibility that the flexibility of the flexible shaft 10 will deteriorate.

As described above, the flexible shaft structure of the first embodiment of the present invention has high rigidity and allows transmission of high torque without lowering the flexibility thereof.

Figure 3:
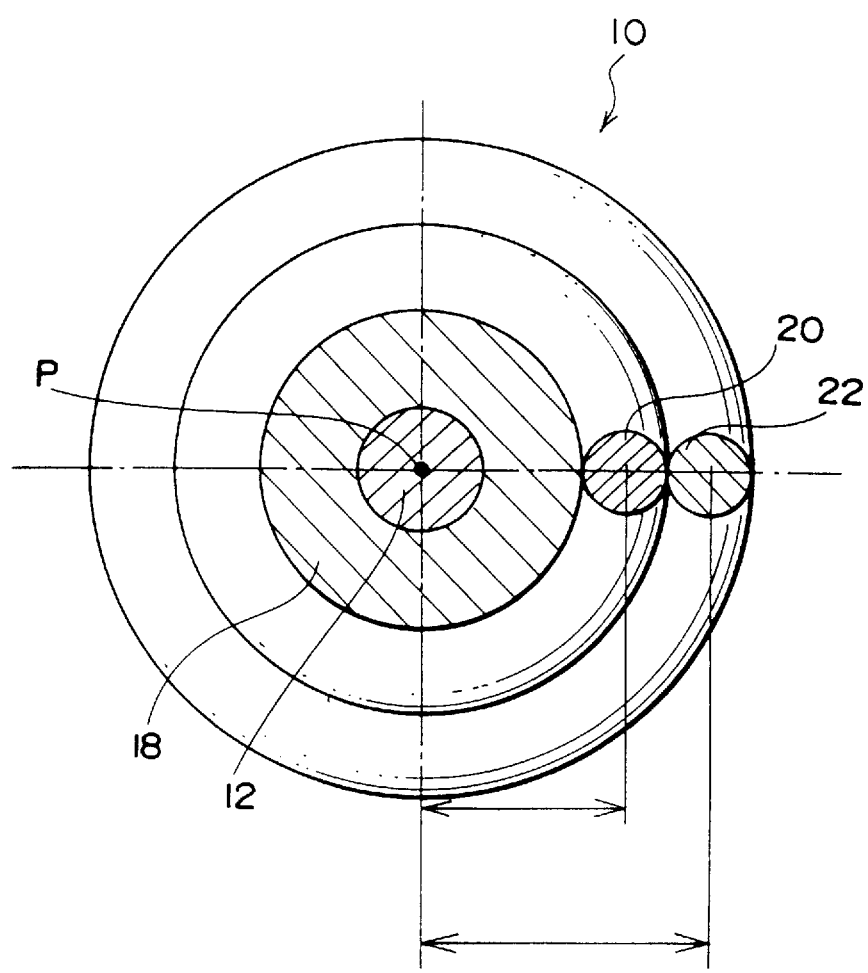
FIG. 3 is a cross-sectional view taken along the lines 3—3 in FIG. 1.
Figure 4:
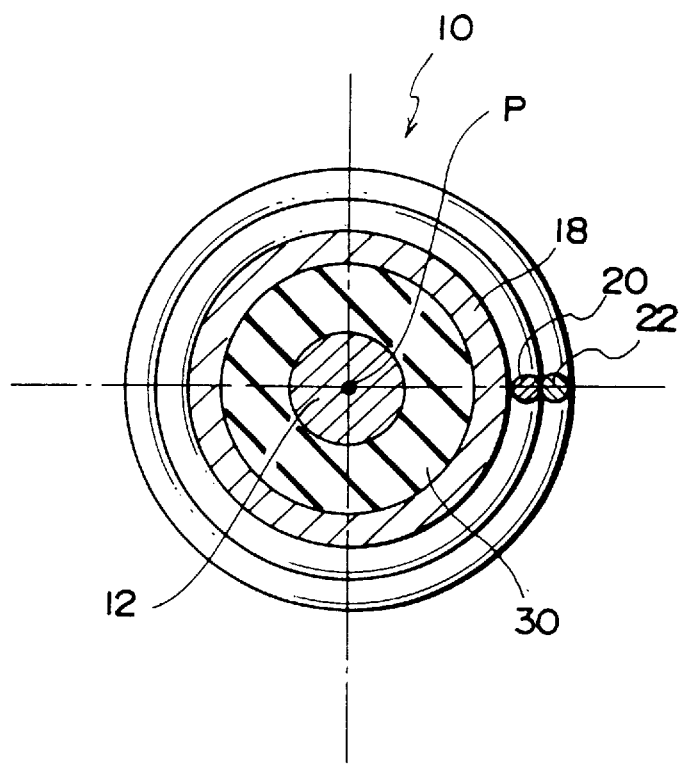
FIG. 4 is a cross-sectional view corresponding to FIG. 3, which shows a flexible shaft structure according to a modified example of the first embodiment of the present invention.

Meanwhile, the first embodiment is, as shown in FIG. 3, constructed in that the first wire 18 is wound around the core wire 12. However, in place of this structure, as shown in FIG. 4, an easily-bending holding layer 30, which is made of rubber (NBR, SBR), urethane or the like and which can hold the core wire 12 at the center thereof, may be provided between the core wire 12 and the first wire 18.

In this case, as compared with the structure in which the first wire 18 is disposed at a position of the holding layer 30 in a state of being superposed in a plurality of layers and the winding diameter of the inward winding wire 20 is made larger so as to increase allowable transfer torque, the flexible shaft 10 can be lightened. Further, it is possible to effect a winding operation in a short time by an amount of decrease in the number of layers of the first wire 18. Since the entire winding diameter of the inward winding wire 20 and the outward winding wire 22 is made larger, the tensile force is made smaller so that the rigidities of the first wire 18 and the core wire 12 to which reaction force of the tensile force is applied can be reduced. For this reason, the flexibility of the flexible shaft 10 can be improved still further.

Next, a second embodiment of the flexible shaft structure of the present invention will be described with reference to FIGS. 5 and 6. It should be noted that the same members as those of the first embodiment will be denoted by the same reference numerals, and a description thereof will be omitted.

Figure 5:
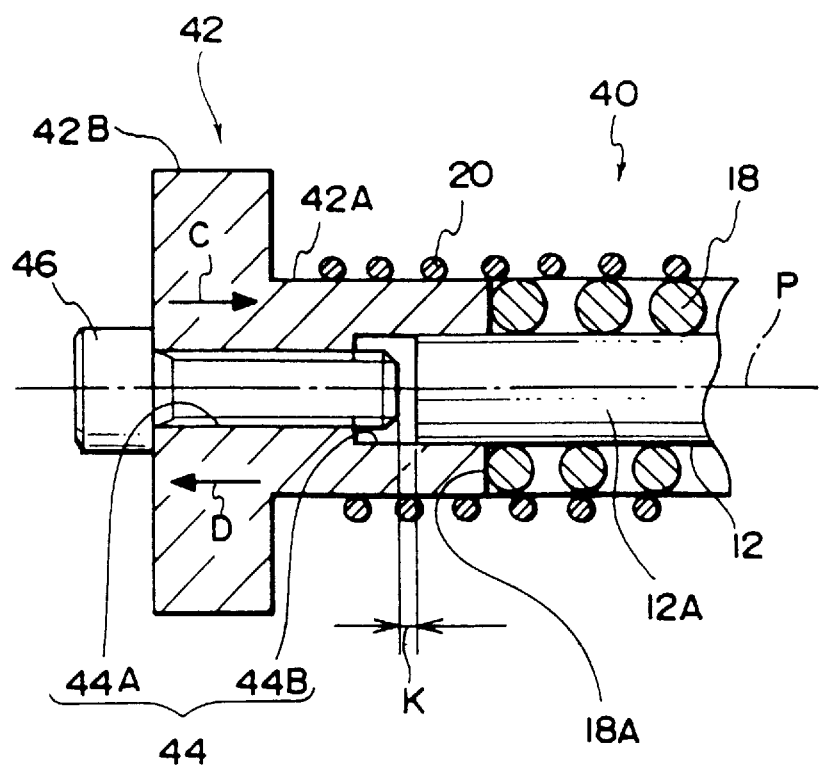
FIG. 5 is a cross-sectional view showing a part of an end portion of a flexible shaft structure according to a second embodiment of the present invention.
Figure 7:
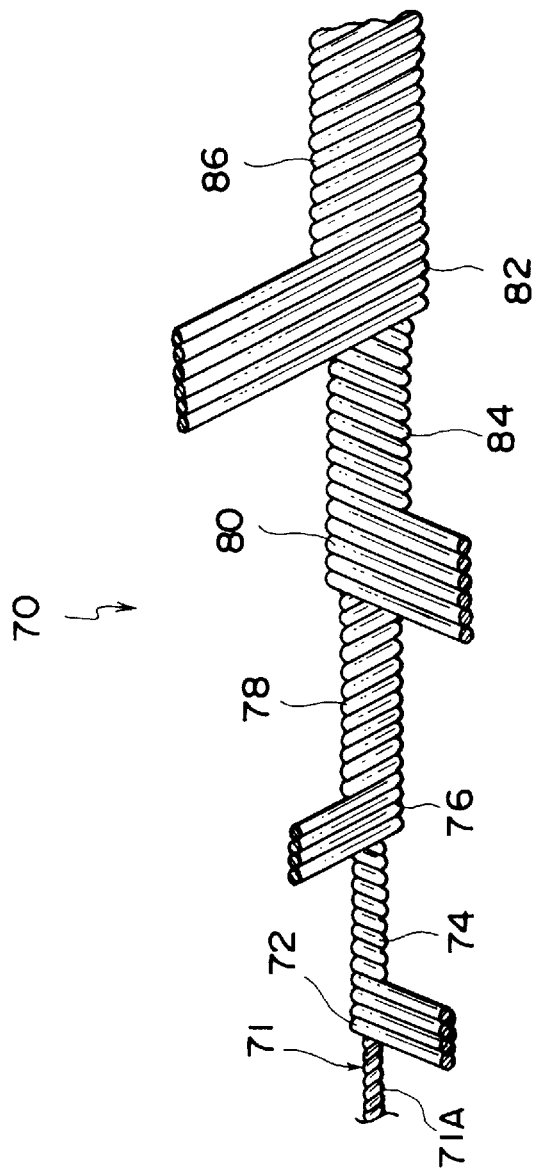
FIG. 7 is a schematic structural view showing a conventional flexible shaft structure.

As shown in FIG. 5, in a flexible shaft 40 of the second embodiment, a holder 42 serving as a holding portion is formed from a shaft portion 42A and a flange portion 42B formed at an end of the shaft portion 42A, and a through hole 44 is formed in the holder 42 along the axial line P. The through hole 44 is formed from a small diameter portion 44A disposed at the side of the flange portion 42B, and a large diameter portion 44B. One end portion 12A of the core Wire 12 is inserted into the large diameter portion 44B and the holder 42 can move with respect to the core wire 12 in directions along the axial line P (i.e., in the directions indicated by arrows C and D in FIG. 5).

A female screw is formed in the inner periphery of the small diameter portion 44A and a bolt 46 serving as movement-amount adjusting means is screwed into the female screw from the side of the flange portion 42B. A clearance K is formed between the bolt 46 and the end portion 12A of the core wire 12.

Further, an end portion of the inward winding wire 20 is fixed by caulking or the like to the outer periphery of the axial portion 42A of the holder 42.

Next, an operation of the second embodiment will be described.

In the flexible shaft structure of the second embodiment, the amount by which the output-side holder 42 moves at the time of transmission of the rotational torque varies in accordance with an amount by which the bolt 46 is inserted into the through hole 44. For this reason, since the clearance K is formed between the bolt 46 of the output-side holder 42 and the core wire 12 by the bolt 46, even when the tensile force is applied to the inward winding wire 20 due to the rotational torque inputted from the input-side holder, load is not applied to the output-side holder 42 due to the clearance K. In this case, although the output-side holder 42 rotates, the torque is not transmitted thereto.

On the other hand, when load is applied to the output-side holder 42 (normally, when the flexible shaft is used, load is applied thereto), the output-side holder 42 does not rotate and moves in a direction in which it abuts against the core wire 12 (i.e., the direction of arrow C in FIG. 5). However, so long as the clearance K exists, the torque is not transmitted to the output-side holder 42.

Accordingly, the period when the clearance K exists is, as shown in FIG. 6, a dead zone (i.e., a low rigid region) H of torque transmission. In the case in which the above-described flexible shaft structure is used for the steering system of the automobile, or the like, transmission of vibration from the output-side holder 42 can be reduced.

Subsequently, when the bolt 46 of the output-side holder 42 and the core wire 12 abut against each other and the clearance K is thereby eliminated, the movement of the output-side holder 42 toward the core wire 12 is prevented and the torque is transmitted to the output-side holder 42.

Further, when the bolt 46 of the output-side holder 42 is brought into a state of being further inserted into the through hole 44 than the state shown in FIG. 5 to press against the core wire 12 so that the tensile force is applied to the inward winding wire 20, the rotational torque inputted from the input-side holder is directly transmitted to the output-side holder 42 and a large torque can be transmitted from the vicinity of a neutral position of rotation accordingly. For this reason, when the flexible shaft structure is used for the steering system of the automobile, or the like, maneuverability improves.

It should be noted that, although not illustrated, the flexible shaft structure according to the second embodiment of the present invention has high rigidity and allows transmission of high torque without lowering the flexibility thereof in the same way as in the first embodiment.

What is claimed is:

1. A flexible shaft structure comprising:

a core wire having flexibility, said core wire having ends;

holding portions provided on each end of said core wire;

a first wire wound around said core wire at substantially at right angles with respect to an axial line of said core wire; and a second wire wound around said first wire at acute angles with respect to the axial line, said acute angles being smaller than the substantially right angles of said first wire, said second wire not being wound at substantially right angles, both ends of said second wire being respectively fixed to said holding portions.

2. A flexible shaft structure according to claim 1, wherein said holding portions are provided at both end portions of said core wire.

3. A flexible shaft structure according to claim 1, further comprising:

movement-amount adjusting means by which at least one of said holding portions is disposed movably in a direction along the axial line of said core wire with respect to said core wire and which adjusts an amount by which the at least one of said holding portions moves.

4. A flexible shaft structure according to claim 3, further comprising:

a third wire wound around said second wire in a winding direction opposite to that of said second wire.

5. A flexible shaft structure according to claim 3, further comprising:

a flexible holding layer interposed between said core wire and said first wire.

6. A flexible shaft structure according to claim 3, wherein the at least one of said holding portions includes a flange portion and a shaft portion extending from a central portion of the flange portion, a through hole is formed which passes through the flange portion and the shaft portion in the axial direction, and a longitudinal-direction end portion of said core wire which corresponds to the at least one of said holding portions is accommodated in the through hole from a side of the shaft portion so that the at least one of said holding portions is movable in the axial direction of said core wire with respect to said core wire.

7. A flexible shaft structure according to claim 1, further comprising:

a third wire wound around said second wire in a winding direction opposite to that of said second wire.

8. A flexible shaft structure according to claim 1, further comprising:

a flexible holding layer interposed between said core wire and said first wire.

9. A flexible shaft structure according to claim 8, wherein said holding layer is provided so as to cover a peripheral portion of said core wire.

10. A flexible shaft structure according to claim 8, wherein said holding layer comprises one of rubber and urethane.

11. The flexible shaft structure according to claim 1, wherein said first wire and said second wire are wound in a substantially common winding direction.

12. A flexible shaft structure for transmitting rotational torque, comprising:
    a core wire having flexibility, said core wire having ends;
    a first disk-shaped holding portion secured to one end of said core wire;
    a second disk-shaped holding portion secured to the other end of said core wire;
    a first wire wound around said core wire substantially at right angles with respect to an axial line of said core wire; and
    a second wire wound around said first wire and of which both ends are respectively fixed to said first and second holding portions.

13. A flexible shaft structure according to claim 12, further comprising:
    a third wire wound around said second wire in a winding direction opposite to that of said second wire.

14. A flexible shaft structure according to claim 13, further comprising:
    a flexible holding layer interposed between said core wire and said first wire.

15. A flexible shaft structure according to claim 12, further comprising:
    a flexible holding layer interposed between said core wire and said first wire.

16. A flexible shaft structure according to claim 15, wherein said holding layer is provided so as to cover a peripheral portion of said core wire.

17. A flexible shaft structure according to claim 16, wherein said holding layer comprises one of rubber and urethane.

18. The flexible shaft structure according to claim 12, wherein said first wire and said second wire are wound in a substantially common winding direction.

19. A flexible shaft structure for transmitting rotational torque, comprising:
    a core wire having flexibility, said core wire having ends;
    a first holding portion secured to one end of said core wire;
    a second holding portion secured to the other end of said core wire and movable along an axial direction of said core wire with respect to the other end of said core wire,
    a first wire wound around said core wire substantially at right angles with respect to an axial line of said core wire; and
    a second wire wound around said first wire and includes one end portion fixed to said first holding portion which is secured to the one end of the core wire and the other end portion fixed to said second holding portion which is secured to the other end of the core wire.

20. A flexible shaft structure according to claim 19, further comprising:
    movement-amount adjusting means for adjusting an amount by which said second holding portion moves in the axial direction of said core wire.

21. A flexible shaft structure according to claim 19, wherein said second holding portion includes a flange portion and a shaft portion extending from a central portion of the flange portion, a through hole is formed which passes through the flange portion and the shaft portion in the axial direction, and the other end of said core is inserted in a movable manner in the through hole from a side of the shaft portion so that said second holding portion is movable in the axial direction of said core wire with respect to said core wire.

22. The flexible shaft structure according to claim 19, wherein said first wire and said second wire are wound in a substantially common winding direction.

23. A flexible shaft structure comprising:
    a core wire having flexibility;
    holding portions provided on the core wire, wherein at least one of the holding portions includes a flange portion and a shaft portion extending from a central portion of the flange portion, a through hole is formed which passes through the flange portion and the shaft portion in an axial direction, and a longitudinal-direction end portion of the core wire, which corresponds to the at least one of the holding portions, is accommodated in the through hole from a side of the shaft portion so that the at least one of the holding portions is movable in the axial direction of the core wire with respect to said core wire;
    a first wire wound around the core wire at substantially right angles with respect to an axial line of the core wire;
    a second wire wound around the first wire, each end of the second wire is fixed to a respective end of the holding portions;
    movement-amount adjusting means by which at least one of the holding portions is movably disposed in a direction along the axial line of the core wire with respect to the core wire and which adjusts an amount by the at least one of the holding portions moves, wherein said movement-amount adjustment means comprises a bolt which is inserted from a side of the flange portion in the through hole.

24. A flexible shaft structure according to claim 23 wherein the holding portions comprise:
    a first holding portion provided at a first end of the core wire; and
    a second holding portion which accommodates a second end of the core wire and is provided to be movable along an axial direction of the core wire with respect to the second end of the core wire.

25. A flexible shaft structure comprising:
    a core wire having flexibility;
    holding portions provided on the core wire, at least one of the holding portions having a through hole in an axial direction, wherein a longitudinal-direction end of the core wire is accommodated in the through hole;
    a first wire wound around the core wire at substantially right angles with respect to an axial line of the core wire;
    a second wire wound around the first wire, each end of the second wire is fixed to a respective end of the holding portions; and
    movement-amount adjusting means by which at least one of the holding portions is movably disposed in a direction along the axial line of the core wire and which adjusts an amount by which at least one of the holding portions moves.

26. A flexible shaft structure for transmitting rotational torque, comprising:

a core wire having a longitudinal axis, said core wire having ends;

holding portions, each end of said core wire being secured to a respective one of said holding portions;

a first wire wound around said core wire substantially at right angles with respect to the longitudinal axis of said core wire; and a second wire having ends, said second wire wound around said first wire, said respective ends of said second wire being directly fixed to said holding portions which hold the ends of the core wire, wherein said first wire provides a clearance between said core wire and said second wire, wherein the second wire is rotated to create a tensile force, wherein a first reaction force responsive to said tensile force is dispersed via at least one of said holding portions along the longitudinal axis of said core, and a second reaction force responsive to said tensile force is dispersed by said first wire, as the first wire tightens against said core wire.

* * * * *